United States Patent [19]

Audeh

[11] 4,137,154
[45] Jan. 30, 1979

[54] PROCESS FOR THE REMOVAL OF NITROGEN COMPOUNDS FROM VARIOUS ORGANIC MEDIA

[75] Inventor: Costandi A. Audeh, Princeton, N.J.

[73] Assignee: Mobil Oil Corporation, New York, N.Y.

[21] Appl. No.: 812,950

[22] Filed: Jul. 5, 1977

[51] Int. Cl.² .............................................. C10G 17/00
[52] U.S. Cl. .................. 208/254 R; 252/414
[58] Field of Search .................. 208/254 R, 254 H; 252/414, 415

[56] References Cited

U.S. PATENT DOCUMENTS

| | | | |
|---|---|---|---|
| 2,999,861 | 9/1961 | Fleck et al. | 208/254 R |
| 3,394,074 | 7/1968 | Buchmann et al. | 208/254 H |
| 3,778,365 | 12/1973 | Hamner et al. | 208/254 H |
| 3,901,822 | 8/1975 | Browning et al. | 252/414 |

*Primary Examiner*—O. R. Vertiz
*Assistant Examiner*—Wayne A. Langel
*Attorney, Agent, or Firm*—Charles A. Huggett; Raymond W. Barclay; Howard M. Flournoy

[57] ABSTRACT

Nitrogen compounds are removed from liquid hydrocarbons such as oils of lubricating viscosity by contacting the hydrocarbons with a solid sorbent, having anhydrous acid gas adsorbed therein. The solid sorbent, which may be amorphous, e.g. silica-alumina, or crystalline, e.g., NaX, is thereafter regenerated for reuse.

23 Claims, No Drawings

PROCESS FOR THE REMOVAL OF NITROGEN COMPOUNDS FROM VARIOUS ORGANIC MEDIA

BACKGROUND OF THE INVENTION

1. Field of the Invention

This application is directed to a process for the removal of nitrogen compounds from organic substances such as liquid hydrocarbons.

2. Description of the Prior Art

It is known to selectively sorb compounds of low polarity from mixtures with compounds of the same or greater polarity by using a crystalline alumino-silicate; U.S. Pat. No. 3,732,326. Anhydrous acidic zeolite aluminosilicates (containing cerium ions) are known to be useful as catalysts in the alkylation of isoparaffins with olefins; British Pat. No. 1,209,942.

Further, acid resistant, heat resistant molecular sieves prepared from volcanic tuff are claimed to be useful for removing low molecular weight contaminants, such as carbon dioxide and ammonia from organic substances, E. Gaeroeg et al. (Inst. High Pressure Res., Budapest) *Brenn st. Chem.* 50 No. 8: T 59 (August, 1969). Also acidic impurities are claimed to be selectively adsorbed from a gas stream with an activated zeolitic molecular sieve having adsorbed ammonia; the impurity may be $CO_2$, $CS_2$, $H_2S$, $NO_2$ or $C_1$-$C_5$ alkylmercaptans; Belgium Patent No. 729,768–69.

Lubricating oil base stocks, especially turbine oils, contain compounds with heteroatoms such as nitrogen and sulfur. The presence of small amounts of sulfur compounds in such hydrocarbons tends to be desirable. However, compounds containing nitrogen usually are not desirable. Therefore, a process which removes undesirable nitrogen compounds from various organic media, e.g., hydrocarbon oils, without reducing sulfur content is highly desirable.

SUMMARY OF THE INVENTION

This application is directed to a novel process wherein undesirable nitrogenous compounds are selectively removed from organic media, such as liquid hydrocarbons, particularly oils of lubricating viscosity without reducing the sulfur content thereof.

This application is particularly directed to a process for effecting the removal of undesirable nitrogenous compounds from liquid organic media comprising contacting said organic media usually at atmospheric pressure and at a temperature below the boiling point of the organic media with a solid sorbent (support) which may be crystalline or amorphous in nature, having a sufficient amount of anhydrous acid gas, e.g., hydrogen chloride, adsorbed therein until substantially all of said undesirable nitrogenous compounds are removed therefrom.

This application is further directed to sorbent regeneration. Crystalline sorbent is regenerated comprising contacting said sorbent with a suitable low boiling solvent at a temperature below its boiling point and in the absence of water; purging with an inert gas, at a temperature above the solvent's boiling point until no solvent remains therein; thereafter contacting said sorbent with a suitable volatile anhydrous base until saturated therewith and heating to a temperature of from 450° to 550° C. in a stream of inert gas until salt-vapor emission stops; thereafter completing the regeneration of said sorbent via steam or air-oxidation by contacting the sorbent as appropriate with steam, air or oxygen at ambient pressure and a temperature of about 500°–700° C. from about 2 to about 24 hours or until substantially all oxidizable matter on the sorbent is removed; cooling to ambient temperature and then contacting said sorbent with anhydrous acid gas until an effective amount is sorbed therein. Amorphous sorbent is regenerated comprising contacting said sorbent with a suitable low boiling solvent at a temperature below the boiling point of the solvent; purging the solvent-extracted sorbent with an inert gas saturated with water vapor or dry steam cooling to ambient temperature and then contacting the sorbent with anhydrous acid gas until an effective amount of said gas is sorbed thereby.

DESCRIPTION OF SPECIFIC EMBODIMENTS

The novel process in accordance with this application is particularly useful for removing undesirable nitrogen compounds from liquid hydrocarbons, preferentially petroleum oils of lubricating viscosity. However, distillate fuel oils and similar light liquid hydrocarbon products including both mineral oil and synthetic products may be similarly treated.

A wide variety of solid sorbents may be advantageously used. These sorbents (supports) can be crystalline or amorphous. Amorphous supports, however, are generally preferred. In either case, the supports may have sufficient surface area and porosity to adsorb an effective amount of anhydrous acid gas. Generally, the surface area should be from about 5 $m^2/gm$ to about 1000 $m^2/gm$; the surface area of zeolite crystalline sorbents is usually from about 100 to about 1000 $m^2/g$ and preferentially about 100–750 $m^2/g$; the surface area of the amorphous sorbents usually from about 5 to about 750 $m^2/g$ and preferably from about 150–600 $m^2/g$. The average pore diameter of the sorbent/support should be from about 3 to about 200Å; the average pore diameter of zeolite crystalline sorbents used herein is usually less than about 10Å, i.e., from about 3–9Å and preferentially 4–7Å. The average pore diameter of amorphous sorbents is usually from about 10 to about 200Å and preferentially from about 20–100Å.

Suitable crystalline sorbents include synthetic or naturally occurring materials such as faujasite, zeolite X, zeolite Y, mordenite, and various other zeolites as may be suitable, such as ZSM-5 type zeolites, i.e., ZSM-11, ZSM-12, ZSM-35, and ZSM-38. Preferred are X and Y zeolites.

Suitable amorphous sorbents include material such as bauxite, alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia, silica-magnesia-zirconia and naturally occurring clays of the attapulgite, montmorillonite and kaolin families, which families include the sub-bentonites and the kaolins commonly known as Dixie, McNamme-Georgia and Florida clays or others in which the main mineral constituent is halloysite, kaolinite, dickite, nacrite or anauxire and activated carbons. Such clays can be used in the raw state as originally mined or initally subjected to calcination, acid treatment or chemical modification. Preferred amorphous sorbents are those selected from various forms of silica, bauxite, aluminas and silica-alumina and mixtures which contain from about 5 to about 95 wt. % of silica. The zeolite sorbents in accordance herewith may be, if desired, composited with any of the above amorphous material including the clays.

Anhydrous hydrogen chloride is the preferred acid gas although other anhydrous gases such as sulfur dioxide, sulfur trioxide, hydrogen bromide and hydrogen sulfide may be used.

The effective amount of adsorbed anhydrous gas will vary dependent upon type of catalyst and adsorption conditions such as temperature and pressure. Usually the sorbents disclosed herein will contain from about 0.001 to about 20 wt. % of adsorbed acid gas, as for example, HCl and preferably from about 0.1 to about 17.5 wt. % based on the total weight of the sorbent.

The nitrogen decontamination process is conveniently carried out, in a continuous flow process or batch process. For example, nitrogen containing compounds are selectively removed from a lubricating oil base stock by contacting a flowing stream of said hydrocarbon with a solid crystalline or amorphous sorbent in the absence of a solvent, said sorbent having adsorbed an effective amount of anhydrous acid gas until substantially all of said undesirable nitrogen compounds are removed therefrom. Thereafter, the sorbent may be regenerated.

The organic media, e.g., hydrocarbon feedstock, is preferably predried, particularly if it contains 100 ppm or more of water prior to contacting, for example, HCl-treated sorbent. For drying purposes, the feedstock is first contacted with a molecular sieve or other suitable drying agent. The feedstock may be again contacted with an additional molecular sieve or other sorbent after decontamination to prevent any desorbed acid gas from passing on to additional treatment stages. Molecular sieves used in this manner are untreated conventional zeolite materials; X and Y zeolites may be advantageously used, e.g., NaX. Any suitable dessicant may be used, for example, calcium hydride, soda lime or other commercial drying agents comprised of silica, alumina or mixtures thereof.

The denitrification may be a single-step or 3-stage integrated process, continuous or batch. The 3-stage process is preferably used when, as stated above, the feed contains 100 ppm or more of water and/or further treatment is to occur after denitification. In such a process the flowing feed stream is first dried by contact with an appropriate dessicant, passed on to the denitrification sorbent and finally contacted by an acid guard such as NaX before the denitrified feed is recovered. No solvent is used in the process.

The hydrocarbon feedstock is usually contacted with the drying agent at atmospheric pressure (pressure may be used if desired for some particular purpose), at ambient temperature or a temperature of from about 70–125° C., preferably 80–100° C. and a liquid hourly space velocity (LHSV) of from about 0.1 to 5, preferably 0.4–0.6. The feedstock is exposed to the treated sorbent under the same general conditions, however, the ratio of feedstock to sorbent is controlled via conventional metering to ensure about 10–100 volumes or more of oil, per volume of sorbent. The contact conditions for the post treatment stage is generally the same as those wherein the feedstock is dehydrated.

Untreated drying sorbents, both crystalline and amorphous, may be regenerated and thereafter reused. For example, NaX sorbents are easily regenerated by being calcined at about 350–450° C. and thereafter reused.

With respect to the anhydrous acid gas treated crystalline sorbents the process for regeneration comprises (1) contacting said sorbent with a suitable low boiling solvent at atmospheric pressure or higher, at a temperature below the boiling point of the solvent and in the absence of water; (2) purging with an inert gas at a temperature above the boiling point of said solvent until no solvent remains therein; (3) then contacting the sorbent with a volatile anhydrous base and heating at a temperature of from about 450–550° C. in a stream of inert gas from about 8–16 hours or until salt vapor emission stops; (4) contacting said sorbent with a sufficient amount of steam, air or oxygen at a temperature of from about 500–700° C. usually at atmospheric pressure for about 4 to about 24 hours to remove substantially all oxidizable matter from the sorbent; (5) and after cooling to ambient temperature and then contacting the sorbent with anhydrous acid gas under ambient conditions of temperature and pressure until about 0.001–20 wt. % of said anhydrous gas is resorbed therein.

During regeneration of the crystalline sorbent the contact temperature for the sorbent and the low boiling solvent is generally about 5° C. below the solvent's boiling point; the solvent purging temperature is from about 25° C. or higher above the boiling point of the solvent; the sorbent is contacted with the solvent at a LHSV of from about 0.1 to 5 with 0.5 being preferable; the contact temperature for the sorbent with anhydrous base is ambient.

Suitable low boiling solvents include light boiling naphthas, hexane, benzene and low boiling distillates.

Suitable volatile anhydrous bases include ammonia, ethyl amine, methyl amine and similar bases.

Steam and air or oxygen oxidation conditions are conventional within the art.

In addition to the process described above for regenerating crystalline sorbent, the anhydrous acid gas treated amorphous sorbents may also be regenerated in the following manner which comprises: (1) contacting said sorbent with a suitable low boiling solvent at a temperature below the boiling point of the solvent, usually under atmospheric pressure for about 10–24 hours at a LHSV of from about 0.5 to 5; (2) purging the solvent-extracted sorbent with an inert gas saturated with water vapor or dry steam at atmospheric pressure and a temperature of from about 450–550° C. at a rate of about 100–500 volumes of inert gas per volume of sorbent for about 2–24 hours; and (3) then after cooling to ambient temperature (CAA), contacting the sorbent with anhydrous acid gas under ambient conditions of temperature and pressure until about 0.001 to 20 weight percent of said anhydrous acid gas is resorbed therein.

Regeneration of the amorphous sorbents therefore includes solvent-extracting the sorbent, purging at about 450–500° C. and at a rate of 350–600 volumes of inert gas per volume of sorbent; a temperature of 500° C. and 500 volumes is preferred. Suitable low boiling solvents include those listed above with respect to the crystalline sorbents.

DESCRIPTION OF SPECIFIC EMBODIMENTS

Example 1 illustrates the preparation of a treated (having adsorbed anhydrous acid gas therein) and untreated crystalline zeolite sorbents. Example 2 is another illustration of a treated zeolite. Example 3 illustrates the preparation for use herein of an amorphous sorbent treated with anhydrous acid gas.

EXAMPLE 1

100 grams each of NaX zeolite molecular sieves (sorbent), 1/16" extrudate having a pore diameter of from about 7–9Å and a surface area of about 750 m$^2$/g were placed in three glass reactors, calcined in a (CAA) stream of dry argon at about 400° C. for 20 hours and then cooled to room temperature using dry argon gas over a period of about 2-4 hours. This procedure purges any adsorbed water. Subsequently, it is necessary to insure that the calcined catalyst remains without exposure to moisture to keep it in a dry state.

One glass reactor containing 100 gms. of calcined molecular sieves was then placed vertically on a stand and exposed to a stream of anhydrous hydrogen chloride gas. The flow of gas was directed downflow through the bed under ambient temp., under atmospheric pressure until loading was substantially complete, about 15.6-17.5 wt. % HCl was adsorbed. An exothermic reaction zone developed at the top of the reactor, which then moved down the bed. After the bottom section of the bed was cooled to ambient temperature in an atmosphere of hydrogen chloride, the sieves were purged to constant weight for about 1 minute with dry argon gas at room temperature to remove easily-desorbed HCl.

Helium or other such inert gas can be used in place of the argon. The HCl may be contacted with the sorbent upflow, or downflow.

EXAMPLE 2

Another 100 g sample of NaX having about 15.6-17.5 wt. % adsorbed HCl was prepared as in Example 1 except for changes as indicated. The 1/16" extrudate was calcined in a glass reactor at 350° C. in argon for 16 hours and cooled to room temperature. A stream of anhydrous hydrogen chloride gas was allowed to contact the zeolite sorbent (NaX), upflow, until the loading was complete. After the top section of the reactor cooled in an atmosphere of HCl gas, the reactor as in Example 1 was purged with dry argon for about one minute to remove any easily-desorbed HCl.

Example 3

20 ml (16.7 gram.) of 40 mesh silica-alumina amorphous catalyst (sorbent) were placed in a 20 ml glass reactor and calcined in a stream of dry argon for 20 hours at about 400° C. The catalyst was then cooled to room temperature in an atmosphere of dry argon gas for approximately 1 to 4 hours. Dry catalyst was then exposed to anhydrous hydrogen chloride gas at atmospheric pressure and at ambient temperature until loading was complete, i.e., until approximately 1 wt.% of anhydrous HCl was absorbed. The amorphous silica-alumina had an average pore diameter of about 80A and a surface area of about 200 m$^2$/g and a silica-alumina ratio of 9:1. As noted supra any suitable dry inert gas, e.g., helium, may be used instead of argon. The HCl may be adsorbed, downflow or upflow.

Example 4

Three reactors containing the untreated and NaX sieves prepared in accordance with Example 1 were placed in the following sequential order: untreated molecular sieves, hydrogen chloride loaded molecular sieves and untreated molecular sieves. Each reactor containing 100 g NaX was then equipped with a means for heating and temperature measurement.

Oil flowed through the molecular sieves in the above-described sequence. The oil was metered by means of a pump and moved upflow through the reactors connected in series. Each of the reactors was placed vertically on a stand, such that the flowing oil enters at the bottom of each reactor and leaves at the top.

The oil treated in accordance with the described process was Arabian Light Stock (properties shown in Table 1 below). Table 2 (below), summarizes the pertinent data obtained on the products treated in accordance therewith. The data therein clearly demonstrates the highly selective denitrogenation of Arab Light Stock using a crystalline zeolite catalyst having adsorbed anhydrous HCl . Prior to denitrogenation in accordance with this application, the oil contained 32 ppm nitrogen and 0.87% wt. sulfur. After treatment, the nitrogen content was reduced to less than 0.2 ppm and the sulfur content was substantially unchanged. This is a typical illustration of the high degree of efficiency with which this process reduced undesirable nitrogen content of a liquid hydrocarbon without effecting any change in the hydrocarbon's sulfur content.

Table 1

| Crude Source and Properties of Stock Used Herein | |
|---|---|
| | 150 S.U.S. Arabian Light Stock |
| Flash Point, PM, ° F | 460 |
| Pour Point, ° F | 0 |
| Gravity, ° API | 30.5 |
| Aniline Point, ° F | 203.7 |
| Sulfur, % Wt. | 0.87 |
| Nitrogen, % Wt. | 0.0032 (32 ppm) |
| Chlorides | negative |

Table 2

150 S.U.S. Arabian Light Stock Treated with Hydrogen Chloride Sorbed/Molecular Sieves NaX*
1/16" Extrudate) at 100° C and 0.05 LHSV

| Time Hours on Stream | Nitrogen ppm. | Color ASTM D1500 | S % Wt. | Chloride Ion |
|---|---|---|---|---|
| Feed | 32 | L 1.5 | 0.87 | negative |
| 49-119 | <0.2 | L 0.5 | — | negative |
| 185 | <0.2 | — | 0.86[a] | negative |
| 281 | <0.2/ | 0.5 | 0.87 | — |
| 305 | <0.2 | | 0.87 | |
| 306 | <0.2 | 0.5 | 0.86[a] | — |
| 306-333 | <0.2 | L 1.0 | 0.87 | negative |

*Example 1
[a]Difference may be due to method duplication errors.

Example 5

Three reactors were packed with 20 mls. each of one of the following (a) untreated calcined NaX molecular sieves, (b) hydrogen-chloride-loaded amorphous silica-alumina sorbent and (c) untreated calcined NaX molecular sieves. The reactors were arranged and connected in series in the order listed. The aliquots of untreated molecular sieves (a) and (c) were obtained commercially and the aliquot of amorphous sorbent was prepared as in Example 3. Each reactor is then equipped with a means for heating and temperature measurement.

Oil (Arabian Light Stock, see Table 1 above) is metered by means of a pump and moves upflow through the reactors in the sequence stated at a temperature of about 100° C. and 0.5 LHSV. Table 3 below summarizes the pertinent data. Although the denitrogenation embodiments exemplified use a three stage system, in many cases only the stage containing sorbent treated with anhydrous gas need be used. However, as stated supra, if the feed is wet (100 ppm moisture) the dehydration step prior to nitrogen removal is advisable and where there is danger of the acid gas damaging equipment in an ongoing process another molecular sieve is used as an acid guard after the nitrogen removal step.

Table 3 thus clearly illustrates the effectiveness of an amorphous sorbent having adsorbed anhydrous acid gas in removing undesirable nitrogen compounds form lubricant composition without reducing the sulfur content.

Table 3
150 S.U.S. Arabian Light Stock Treated with Hydrogen Chloride Sorbed on Fresh Silica-Alumina Catalyst* At 100° C and 0.5 LHSV

| Volume Oil Processed | S % Wt. | Nitrogen ppm. | Nitrogen Removed, % | Chloride Ion |
|---|---|---|---|---|
| 0.5 | 0.87 | <0.2 | >99.9 | — |
| 2.2 | — | <0.2 | — | — |
| 7.2 | — | <0.2 | — | — |
| 11.6 | — | <0.2 | — | — |
| 12.3 | — | — | — | negative |
| 31.6 | 0.87 | 0.2 | 99.4 | — |
| 39.9 | — | 1.6 | 95.0 | — |
| 43.0 | — | 2.4 | 92.5 | — |
| 64.2 | — | 7.4 | 76.9 | negative |

*Example 3.

Table 4
150 S.U.S. Arabian Light Stock Untreated Fresh Silica-Alumina Catalyst At 100° C and 0.5 LHSV

| Volume Oil Processed | Nitrogen ppm. | Nitrogen Removed, % | S % Wt. |
|---|---|---|---|
| 0.6 | 0.2 | 99.9 | 0.87 |
| 14 | 2.0 | 93.8 | |
| 26 | 9.0 | 71.8 | |
| 39 | 15.6 | 51.2 | |

From a comparison of Tables 2, 3 and 4 it can be seen that both the crystalline and amorphous sorbents treated in accordance with this invention remove substantially all of the undesirable nitrogen compounds contained in the feedstock with which they are contacted. The untreated silica-alumina as shown by Table 4 removes very little of said nitrogen.

Example 6

Sodium X molecular sieves in accordance with this invention and which had been used in the nitrogen removal process described hereinabove are regenerated as follows: oil from the oil-saturated aged sorbent is extracted with a suitable low boiling solvent such as hexane. The solvent-extracted sorbent is then purged with argon gas for about 4-16 hours to remove any residual solvent. The now anhydrous sorbent is then heated in a stream of argon. The sorbent is now cooled to ambient temperature and is then contacted with anhydrous ammonia; followed by an argon purge at 450° C. unit salt-vapor emission stops. The sorbent is then regenerated in steam or alternatively oxidatively in air. Anhydrous hydrogen chloride is then resorbed by the sieves in the manner described in Examples 1 and 2. The sieves can now be used in the manner described above to remove nitrogen compounds from hydrocarbon base stock.

Example 7

A silica-alumina sorbent (catalyst) prepared in accordance with Example 3 which had been used in the process described above was regenerated as follows: Anhydrous ammonia was allowed to saturate the solvent extracted catalyst followed by an argon purge at about 500° C. An air-oxidation followed, during which the temperature increased to 680° C. The sorbent then was allowed to cool in argon to ambient temperature, and thereafter anhydrous hydrogen chloride gas was resorbed by the sorbent as described in Example 3. This catalyst was then used to remove nitrogen in accordance with the process embodied herein from hydrocarbon base stock.

Examples 6 (Table 5) and 7 (Table 6) illustrate the method utilized herein for regenerating the sorbents; Example 6 exemplifies regeneration of a zeolite crystalline sorbent and Example 7 exemplifies regeneration of an amorphous silica-alumina sorbent.

Table 5
150 S.U.S. Arabian Light Stock Treated with Hydrogen Chloride Sorbed on Regenerated NaX Catalyst (Example 6) at 100° C and 0.6 LHSV

| Volume Oil Processed | Nitrogen ppm. | Nitrogen Removed, % |
|---|---|---|
| 0-7.6 | <0.2 | >99.9 |
| 20.2 | <0.2 | >99.9 |
| 31.3 | 3.4 | 89.4 |
| 35.8 | 5.2 | 83.8 |
| 50.0 | 8.4 | 73.8 |
| 88.3 | 14.2 | 55.6 |

The data contained in Table 5 above clearly illustrates the highly effective removal of undesired nitrogen compounds from Arabian Light base stock by contacting it, in accordance with the process embodied herein, with regenerated NaX sorbent having anhydrous hydrogen chloride adsorbed therein.

Table 6 is a comparison of various sorbents in accordance with this invention. Both nitrogen removal and short term oxidative stability were evaluated. The sorbents of this invention are shown thereby to be substantially superior for their intended purpose. Table 6 below thus specifically shows that HCl adsorbed on various calcined zeolite and amorphous sorbents as embodied herein, remove more than 99% of nitrogen compounds in Arab Light stock and thereby provide lubricant compositions of improved oxidative stability.

However, of the solid sorbents tested, silica-alumina catalyst, when calcined in air at 680° C. and loaded with 1% wt. HCl is the most advantageous. It removes nearly an equimolar amount of nitrogen compounds from said stock.

Product oil obtained after nitrogen removal has good color, improved short-term oxidation stability, does not contain inorganic chloride, and does not show an increase in total acid number, (see Table 6) or a change in sulfur content.

Table 6
REMOVAL OF NITROGEN COMPOUNDS FROM ARAB LIGHT STOCK WITH HYDROGEN CHLORIDE AT 100° C

| Contact Mass | LHSV | Volume Ratio Oil/Solid | Nitrogen ppm | Chloride Cl⁻ | ASTM D2272 RBOT* min. | NN |
|---|---|---|---|---|---|---|
| HCl/NaX | 0.05 | 0-10 | <0.2 | negative | 374/345 | 0.0 |
| (15.6% wt. HCl) | | 10-24 | <0.2 | negative | 345/370 | 0.0 |
| | | 31 | 2.3 | negative | — | 0.0 |
| HCl/Zeolon 200H | 0.05 | 0-12 | <0.2 | negative | 375/340 | 0.0 |

Table 6-continued
REMOVAL OF NITROGEN COMPOUNDS FROM ARAB LIGHT STOCK WITH HYDROGEN CHLORIDE AT 100° C

| Contact Mass | LHSV | Volume Ratio Oil/Solid | Nitrogen ppm | Chloride Cl⁻ | ASTM D2272 RBOT* min. | NN |
|---|---|---|---|---|---|---|
| (7% wt. HCl) | | | | | | |
| HCl/NaX | 1.02 | 0-6 | <0.2 | — | — | — |
| (15.7% wt. HCl) | | 15 | <0.2 | — | — | — |
| | | 33 | <0.2 | negative | — | 0.0 |
| | | 43 | 14.6 | — | — | — |
| | | 59 | 16.2 | — | — | — |
| HCl/Equilibrium | 0.5 | 10 | <0.2 | — | — | — |
| Bauxite | | 13 | 3.0 | — | — | — |
| (4% wt. HCl) | | 35 | 7.4 | — | — | — |
| | | 44 | 8.8 | negative | — | 0.0 |
| HCl/Silica-Alumina | 0.5 | 0-6 | <0.2 | — | 355/370 | — |
| Calcined at 350° C | | 6-14 | <0.2 | — | 330 | — |
| in Argon | | 14-26 | — | negative | 350/385 | 0.0 |
| (1% wt. HCl | | 26-39 | — | — | 345/305 | — |
| | | 39 | 15.6 | — | — | — |
| HCl/Silica-Alumina | 0.6 | 9-20 | <0.2 | — | — | — |
| Recalcined at 680° C | | 30-44 | <0.2 | — | — | — |
| in Air | | 44-59 | <0.2 | negative | — | 0.0 |
| (1% wt. HCl) | | 72-87 | <0.2 | — | — | — |
| | | 87-112 | <0.2 | — | — | — |
| | | 113 | 9.2 | — | — | — |

*Rotary Bomb Oxidation Stability Test; RBOT of untreated oil is 270 minutes.

This application accordingly clearly illustrates the highly effective use of anhydrous acid gas adsorbed on solid sorbents as a means for removing undesirable nitrogen compounds from liquid hydrocarbon media without affecting their sulfur content but appreciably decoloring them. This application had also shown that the subject sorbents can be regenerated and reused for this purpose, thus avoiding the expensive once through processes typical of acid resin sorbents.

Although preferred embodiments have been exemplified, variations can be resorted to and are within the scope of this invention as one of ordinary skill in the art will readily understand.

What is claimed is:

1. A process for effecting the removal of undesirable nitrogenous compounds from liquid organic media comprising contacting said organic media under removal conditions at a temperature below the boiling point of the organic media with a solid sorbent wherein said sorbent is selected from the group consisting of crystalline and amorphous forms of silica, bauxite, X and Y zeolites, alumina, silica-alumina and mixtures of silica and alumina having an effective amount of from about 0.001-20 weight percent of an anhydrous acid gas selected from the group consisting of hydrogen bromide and hydrogen chloride adsorbed therein until substantially all of said undesirable compounds are removed from said organic media.

2. The process of claim 1 where the sorbent has a surface area of from about 5 to about 1000 m²/gm and a pore diameter of from about 3 to about 200 Angstroms and wherein the amount of anhydrous acid adsorbed thereon is from about 0.1 wt. % to about 17.5 wt. %.

3. The process of claim 2 where the sorbent is an amorphous form having an average pore diameter from about 20 to about 100 Angstroms and a surface area of from about 150 to about 600 m²/gm.

4. The process of claim 3 where the sorbent is selected from the group consisting of silica, alumina, bauxite, silica-alumina and silica and mixtures of alumina.

5. The process of claim 4 where the sorbent is an amorphous silica-alumina having from about 5 to about 95 wt. % silica.

6. The process of claim 2 where the sorbent is a crystalline zeolite form having a surface area of from about 100 to about 700 m²/gm and an average pore diameter of from 3-9Å.

7. The process of claim 6 where the sorbent is selected from X and Y zeolites.

8. The process of claim 7 where said sorbent is a NaX zeolite.

9. The process of claim 1 where a crystalline sorbent as described therein for removing said nitrogenous compounds is regenerated comprising (1) contacting said sorbent in the absence of water with a suitable low boiling solvent selected from naphthas, hexane, benzene and low boiling hydrocarbon distillates at atmospheric pressure and at a temperature below the boiling point of the solvent and (2) purging said sorbent with an inert gas at a temperature above the boiling point of said solvent until no solvent remains thereon; (3) then contacting said crystalline sorbent with a volatile anhydrous base and heating at a temperature of from about 450°-550° C. in a stream of inert gas for about 8-16 hours or until salt vapor emission stops; (4) thereafter contacting said sorbent with an amount of steam, air or oxygen in an amount sufficient to remove substantially all oxidizable matter from the sorbent at a temperature of from about 500°-700° C.; (5) and then contacting the sorbent with anhydrous acid gas under ambient conditions of temperature and pressure until a sufficient amount of from about 0.001-20 wt. % of said anhydrous gas effective to remove said undesirable nitrogenous compounds from said liquid organic media is resorbed therein.

10. The process of claim 9 where approximately 0.1 to about 17.5 wt. %, based on the total weight of the sorbent composition, of anhydrous acid gas is resorbed.

11. The process of claim 10 where the anhydrous acid gas resorbed is hydrogen chloride.

12. The process of claim 11 where the amount of hydrogen chloride resorbed is about 15-20 wt. %.

13. The process of claim 1 wherein an amorphous sorbent as described therein for removing said nitrogenous compounds is regenerated comprising (1) contacting said sorbent with a suitable low boiling solvent selected from light boiling naphthas, hexane, benzene and low boiling distillates at a temperature below the boiling point of said solvent and under atmospheric pressure for about 10–24 hours at a LHSV of about 0.5; (2) purging the solvent-extracted amorphous sorbent with an inert gas saturated with water vapor or dry steam at atmospheric pressure and a temperature of from about 450°–550° C. at a rate of about 500 volumes of inert gas per volume of sorbent for about 2–24 hours; and (3) then contacting the sorbent with anhydrous acid gas under ambient conditions of temperature and pressure until an amount of from 0.001 to 20 wt. % based on the total weight of the sorbent of said anhydrous acid gas effective to remove undesirable nitrogenous compounds from liquid organic media is resorbed thereby.

14. The process of claim 13 where the anhydrous acid gas resorbed is hydrogen chloride.

15. The process of claim 14 where the amount of hydrogen chloride resorbed is about 1 wt. %.

16. The process of claim 13 wherein said solvent extracted amorphous sorbent prior to contacting said anhydrous acid gas is purged with air or oxygen at a temperature of 500°–700° C. to remove substantially all oxidizable matter therefrom.

17. The process of claim 13 where approximately 0.01 to about 17.5 wt. %, based on the total weight of the sorbent composition of anhydrous acid gas is resorbed.

18. The process of claim 1 where the organic media is a liquid hydrocarbon.

19. The process of claim 2 where the hydrocarbon is an oil of lubricating viscosity.

20. The process of claim 1 where the anhydrous acid gas is hydrogen chloride.

21. A process for effecting the removal of undesirable nitrogenous compounds from liquid organic media containing same comprising contacting said organic media at atmospheric pressure or slightly higher and at a temperature of from ambient to about 5° C. below the boiling point of the organic media with (1) a suitable dehydrating or drying agent, (2) a solid sorbent selected from the group consisting of crystalline and amorphous forms of sorbents selected from the group consisting of silica, bauxite, alumina, silica-alumina and mixtures of silica and alumina and X and Y zeolites having an amount of from 0.001 to 20 wt. % based on the total weight of the sorbent of an anhydrous acid gas selected from the group consisting of hydrogen bromide and hydrogen chloride adsorbed therein effective to remove said nitrogenous compounds and (3) with a crystalline sorbent not having been sorbed with said acid gas.

22. The process of claim 21 where the dehydrating agent and the crystalline sorbent not sorbed with acid gas are zeolite molecular sieves.

23. The process of claim 22 where the crystalline sorbent is NaX zeolites.

* * * * *

UNITED STATES PATENT AND TRADEMARK OFFICE
CERTIFICATE OF CORRECTION

PATENT NO. : 4,137,154

DATED : January 30, 1979

INVENTOR(S) : COSTANDI AMIN AUDEH

It is certified that error appears in the above—identified patent and that said Letters Patent are hereby corrected as shown below:

Column 5, line 50, "absorbed" should read --adsorbed--.

Signed and Sealed this

Tenth Day of July 1979

[SEAL]

Attest:

Attesting Officer

LUTRELLE F. PARKER
Acting Commissioner of Patents and Trademarks